(12) United States Patent
Thuries et al.

(10) Patent No.: US 9,158,954 B2
(45) Date of Patent: Oct. 13, 2015

(54) SYSTEMS AND METHODS TO READ MACHINE-READABLE SYMBOLS

(71) Applicant: Intermec IP Corp., Everett, WA (US)

(72) Inventors: Serge Thuries, Saint Jean (FR); Alain Gillet, Toulouse (FR)

(73) Assignee: Intermec IP, Corp., Everett, WA (US)

( * ) Notice: Subject to any disclaimer, the term of this patent is extended or adjusted under 35 U.S.C. 154(b) by 224 days.

(21) Appl. No.: 13/786,241

(22) Filed: Mar. 5, 2013

(65) Prior Publication Data

US 2013/0306728 A1 Nov. 21, 2013

Related U.S. Application Data

(60) Provisional application No. 61/647,430, filed on May 15, 2012.

(51) Int. Cl.
*G06K 7/10* (2006.01)
*G06K 7/12* (2006.01)

(52) U.S. Cl.
CPC ........ *G06K 7/10831* (2013.01); *G06K 7/10732* (2013.01); *G06K 7/12* (2013.01)

(58) Field of Classification Search
USPC ........................................................ 235/455
See application file for complete search history.

(56) References Cited

U.S. PATENT DOCUMENTS

| 2,612,994 | A | 10/1952 | Woodland et al. | |
| 2006/0283952 | A1* | 12/2006 | Wang | 235/462.01 |
| 2008/0017717 | A1* | 1/2008 | Miyazaki et al. | 235/472.01 |
| 2008/0319795 | A1* | 12/2008 | Poteet et al. | 705/3 |
| 2010/0213259 | A1* | 8/2010 | Gao | 235/469 |
| 2012/0067955 | A1* | 3/2012 | Rowe | 235/454 |

* cited by examiner

*Primary Examiner* — Michael G Lee
*Assistant Examiner* — David Tardif
(74) *Attorney, Agent, or Firm* — Additon, Higgins & Pendleton, P.A.

(57) ABSTRACT

Systems and methods of reading machine-readable symbols are provided. A method of reading a machine-readable symbol includes emitting by a first source outgoing electromagnetic energy comprising wavelengths in a first portion of the electromagnetic spectrum towards a target comprising the machine-readable symbol. Incoming electromagnetic energy comprising wavelengths in a second portion of the electromagnetic spectrum reflected or emitted by the machine-readable symbol are discerned by a global shutter sensor after transmission through at least a first portion of a color filter array having a plurality of portions.

26 Claims, 3 Drawing Sheets

SYSTEMS AND METHODS TO READ MACHINE-READABLE SYMBOLS

BACKGROUND

1. Field

This disclosure generally relates to readers configured to read machine-readable symbols.

2. Description of the Related Art

Machine-readable symbols are generally formed using one or more machine-readable symbol characters selected from a machine-readable symbology. One-dimensional ("1D") or linear machine-readable symbols contain information generally encoded in the spacing between leading and trailing edges of successive marks, typically formed as a series of lines and/or spaces and often colloquially referred to as "barcode symbols." Two-dimensional ("2D") machine-readable symbols contain information generally encoded in the spacing or position of polygonal patches. Two-dimensional machine readable symbols may be formed from characters selected from area code or matrix code symbologies. Two-dimensional machine readable symbols typically encode information in a higher density format than one dimensional machine readable symbols. Machine-readable symbols can be generated using virtually any media (e.g., ink, toner, etching, and the like on a solid substrate or an image formed using monochromatic or multicolor pixels on a display device, to provide just a few examples) and can be placed upon any media (e.g., paper, plastic, metal, cloth, and/or an electronic display, to provide just a few examples).

The use of machine-readable symbols to optically encode information extends back 60 years to the first U.S. patent granted in 1952 for a "bull's-eye" type machine-readable symbol intended for use in the retail grocery business (U.S. Pat. No. 2,612,994 to Woodland, et al., entitled "Classifying Apparatus and Method"). In the intervening 60 years many additional types of machine-readable symbologies have been proposed with several, such as the one dimensional Universal Product Code ("UPCs"), gaining widespread acceptance. The early data limitations of one-dimensional machine-readable symbols (e.g., barcode symbols) have been at least partially remedied through the more recent adoption of two-dimensional machine-readable symbols.

The use of machine-readable symbols has expanded well beyond the original product identification role envisioned in 1952. Today, one and two dimensional machine-readable symbols (generically "machine-readable symbols") can be found on railcars, automotive parts, driver's licenses, advertisements, shipping labels, and even on packaging. With the increasing prevalence of machine-readable symbols in everyday life, the type of media used to form the machine-readable symbol and the substrate upon which the machine-readable symbol is displayed also continue to increase. Machine-readable symbols can be visibly printed or otherwise formed using conventional inks and/or printing technologies such that the resulting machine-readable symbol is visible to humans without aid. Alternatively, machine-readable symbols can be invisibly printed using specialized inks such as infrared or ultraviolet fluorescing materials rendering the resultant machine-readable symbols invisible to an unaided human observer. While typically formed as a binary image (e.g., black and white) some symbologies display color, for example to increase data or information density of the resulting machine-readable symbols. Machine-readable symbols can also form part of a security feature, for example where the machine-readable symbols are printed in multiple colors or printed using a partially or completely invisible medium, for example an ink reflective only in the infrared electromagnetic spectrum.

Post offices around the world have adopted various machine-readable symbologies which has resulted in machine-readable symbols in a wide variety of shapes, forms, and styles. Such symbols may provide concisely printed postage, class of service, and other relevant shipping (e.g., origination and/or destination addresses), tracking and payment data directly on a face of letters, parcels, and other packages. The increasing use of diverse forms of symbologies on items in commerce has generated a need for machine-readable symbol readers capable of quickly and easily adapting to a multitude of machine-readable symbol styles and symbologies.

BRIEF SUMMARY

A machine-readable symbol reader may be summarized as including a housing; a first source operable to emit outgoing electromagnetic energy substantially at wavelengths in a first portion of an electromagnetic spectrum, out of the housing toward a target, the first portion of the electromagnetic spectrum consisting essentially of at least one of a blue portion or an ultraviolet portion of the electromagnetic spectrum, inclusive; at least one switch coupled to control at least the first source to selectively cause the first source to emit the outgoing electromagnetic energy substantially at wavelengths in the first portion of the electromagnetic spectrum; a global shutter sensor positioned in the housing to receive incoming electromagnetic energy returned from the target; and a color filter array disposed in the housing relative to the global shutter sensor to filter the incoming electromagnetic energy, the color filter array including at least a first portion of which substantially passes incoming electromagnetic energy of wavelengths in a second portion of the electromagnetic spectrum to at least one portion of the global shutter sensor and which first portion substantially limits the passage of incoming electromagnetic energy of wavelengths outside of the second portion of the electromagnetic spectrum to the global shutter sensor, the second portion of the electromagnetic spectrum consisting essentially of at least one of a red portion or an infrared portion of the electromagnetic spectrum, inclusive.

The first portion of the magnetic spectrum may include at least a portion of the blue portion of the electromagnetic spectrum and at least a portion of the ultraviolet portion of the electromagnetic spectrum. The first source may be operable to emit the electromagnetic energy at an intensity level substantially greater than an intensity level of light in an ambient environment. The first source may be operable to emit the outgoing electromagnetic energy at wavelengths of about 495 nanometers (nm) or less. The color filter array may include a Bayer filter; and wherein the first portion of the color filter array may include an aggregate area of at least about 25% of a color filter array area relative to the global shutter sensor. The first source may include at least one blue light emitting diode (LED). The at least one switch may be coupled to control the global shutter sensor to selectively place the global shutter sensor in an image capture mode without emission of the first outgoing electromagnetic radiation by the first source; and the filter may include at least a second portion which substantially passes the incoming electromagnetic energy of wavelengths in the about 380 nm to about 760 nm portion of the electromagnetic spectrum to the global shutter sensor. The global shutter sensor may include at least one output to provide a signal to the at least one switch, the at least one switch configured to cause the first source to emit the outgoing electromagnetic energy substantially in the first portion of the electromagnetic spectrum as image data is acquired from at least a portion of the global shutter sensor. The emission by the first source of the outgoing electromagnetic energy of wavelengths substantially in the first portion of the electromagnetic spectrum may include a pulsed emission having a duration substantially equal to an image acquisition duration of at least a portion of the global shutter sensor. The machine-readable symbol reader may further include a wide band source operable to emit outgoing electromagnetic energy substantially at wavelengths in a third portion of the electromagnetic spectrum out of the housing toward the target, the third portion of the electromagnetic spectrum consisting essentially of wavelengths from about 380 nanometers (nm) to about 760 nm, wherein: the at least one switch is coupled to control at least the wide band source to selectively emit the outgoing electromagnetic energy of wavelengths substantially in the third portion of the electromagnetic spectrum, and the at least one switch selectively controls the wide band source to not emit the outgoing electromagnetic energy of wavelengths substantially in the third portion of the electromagnetic spectrum when the first source emits the outgoing electromagnetic energy of wavelengths substantially in the first portion of the electromagnetic spectrum; and the filter includes at least a second portion that substantially passes incoming electromagnetic energy having wavelengths in the third portion of the electromagnetic spectrum to at least one portion of the global shutter sensor. The at least one switch may further selectively control the first source to not emit the outgoing electromagnetic energy of wavelengths substantially in the first portion of the electromagnetic spectrum when the wide band source emits the outgoing electromagnetic energy of wavelengths substantially in the third portion of the electromagnetic spectrum. The wide band source may be operable to emit the electromagnetic energy at an intensity level substantially greater than an intensity level of light in an ambient environment. The second source may include at least one of a red light emitting diode (LED) and a white light emitting diode (LED). The global shutter sensor may further include at least one output that provides a signal to the at least one switch to cause either the first source to emit outgoing electromagnetic energy substantially in the first portion of the electromagnetic spectrum or the wide band source to emit outgoing electromagnetic energy substantially at wavelengths in the third portion of the electromagnetic spectrum as image data is acquired from at least a portion of the global shutter sensor. The at least one switch may cause the first source or the broad band source to emit the outgoing electromagnetic energy as one or more pulses, the one or more pulses having a duration substantially equal to the image acquisition duration of at least a portion of the global shutter sensor. The machine-readable symbol reader may further include a narrow band source operable to emit outgoing electromagnetic energy of wavelengths substantially in the second portion of the electromagnetic spectrum out of the housing toward the target, and wherein: the at least one switch may be coupled to control the narrow band source to selectively emit the outgoing electromagnetic energy of wavelengths substantially in the second portion of the electromagnetic spectrum and the at least one switch may selectively control the narrow band source to not emit the outgoing electromagnetic energy of wavelengths substantially in the second portion of the electromagnetic spectrum when the first source emits the outgoing electromagnetic energy of wavelengths substantially in the first portion of the electromagnetic spectrum; and the first portion of the filter may substantially pass the incoming electromagnetic energy of wavelengths in at least part of the second portion of the electromagnetic spectrum to at least one portion of the global shutter sensor. The narrow band source may include at least one infrared light emitting diode (LED). The global shutter sensor may include at least one output that provides a signal to the at least one switch to cause either the first source to emit outgoing electromagnetic energy substantially in the first portion of the electromagnetic spectrum or the narrow band source to emit outgoing electromagnetic energy substantially at wavelengths in the second portion of the electromagnetic spectrum the third outgoing electromagnetic energy as image data is acquired from at least a portion of the global shutter sensor. The at least one switch may cause the first source or the narrow band source to emit the outgoing electromagnetic energy as one or more pulses, the one or more pulses having a duration substantially equal to the image acquisition duration of at least a portion of the global shutter sensor.

An image detection method may be summarized as including supplying a signal to control at least a first source; responsive to supplying the control signal to the first source, emitting by the first source an outgoing electromagnetic energy substantially at wavelengths in a first portion of an electromagnetic spectrum toward a target; the first portion of the electromagnetic spectrum consisting essentially of at least one of a blue portion or an ultraviolet portion of the electromagnetic spectrum, inclusive; and responsive to the emitting the outgoing electromagnetic energy towards the target, acquiring data from a global shutter sensor that receives, through a color filter array, an incoming electromagnetic energy returned from the target, the color filter array including at least a first portion that substantially passes the incoming electromagnetic energy of wavelengths in a second portion of the electromagnetic spectrum to at least one portion of the global shutter sensor and which first portion substantially limits the passage of incoming electromagnetic energy of wavelengths outside of the second portion of the electromagnetic spectrum to the global shutter sensor, the second portion of the electromagnetic spectrum consisting essentially of at least one of a red portion or an infrared portion of the electromagnetic spectrum, inclusive.

Supplying a signal to at least a first source may include detecting actuation of an actuator disposed at least partially on an exterior surface of a housing, the actuator to provide an input to the global shutter sensor; and generating the signal as an output from the global shutter sensor upon receipt of the input to the global shutter sensor. Emitting by the first source the outgoing electromagnetic energy substantially at wavelengths in the first portion of an electromagnetic spectrum toward the target may include emitting a pulsed emission of the outgoing electromagnetic energy substantially at wavelengths in the first portion of the electromagnetic spectrum as the data is acquired from the global shutter sensor. The image detection method may further include decoding at least a portion of the data acquired from the global shutter sensor, the decoding including at least one of: determining a validity associated with the target; determining a monetary value associated with the target; determining an origination point associated with the target; determining a destination point associated with the target; and determining a class of service associated with the target. The image detection method may further include supplying a signal to control a wide band source; responsive to supplying the signal to control the wide band source, emitting by the wide band source an outgoing electromagnetic energy substantially at wavelengths in a third portion of the electromagnetic spectrum toward the target, the third portion consisting essentially of wavelengths from about 380 nanometers (nm) to about 760 nm, wherein the signal selectively inhibits the wide band source from emitting the outgoing electromagnetic energy of wavelengths substantially in the third portion of the electromagnetic spectrum when the first source is emitting the outgoing electromagnetic energy of wavelengths substantially in the first portion of the electromagnetic spectrum, the color filter array includes at least a second portion that substantially passes incoming electromagnetic energy having wavelengths in the third portion of the electromagnetic spectrum to a second portion of the global shutter sensor. The signal controlling the first source may not allow the first source to emit the outgoing electromagnetic energy of wavelengths substantially in the first portion of the electromagnetic spectrum when the wide band source emits the outgoing electromagnetic energy of wavelengths substantially in the third portion of the electromagnetic spectrum. Emitting by the first source the outgoing electromagnetic energy substantially at wavelengths in the first portion of an electromagnetic spectrum toward the target may include emitting a pulsed emission of the outgoing electromagnetic energy substantially at wavelengths in the first portion of the electromagnetic spectrum as the data is acquired from the global shutter sensor, wherein emitting by the wide band source the outgoing electromagnetic energy substantially at wavelengths in the third portion of an electromagnetic spectrum toward the target may include emitting a pulsed emission of the outgoing electromagnetic energy substantially at wavelengths in the third portion of the electromagnetic spectrum as the data is acquired from the global shutter sensor. The image detection method may further include supplying the signal to control a narrow band source; responsive to supplying the signal to control the narrow band source, emitting by the narrow band source an outgoing electromagnetic energy substantially at wavelengths in the second portion of the electromagnetic spectrum out of the housing toward the target, wherein the signal selectively inhibits the narrow band source from emitting the outgoing electromagnetic energy of wavelengths substantially in the second portion of the electromagnetic spectrum when the first source is emitting the outgoing electromagnetic energy of wavelengths substantially in the first portion of the electromagnetic spectrum, the first portion of the color filter array substantially passes incoming electromagnetic energy having wavelengths in the second portion of the electromagnetic spectrum to the first portion of the global shutter sensor. The signal may further selectively control the first source to not emit the outgoing electromagnetic energy of wavelengths substantially in the first portion of the electromagnetic spectrum when the narrow band source emits the outgoing electromagnetic energy of wavelengths substantially in the second portion of the electromagnetic spectrum. Emitting by the first source the outgoing electromagnetic energy substantially at wavelengths in the first portion of an electromagnetic spectrum toward the target may include emitting a pulsed emission of the outgoing electromagnetic energy substantially at wavelengths in the first portion of the electromagnetic spectrum as the data is acquired from the global shutter sensor, emitting by the narrow band source the outgoing electromagnetic energy substantially at wavelengths in the second portion of an electromagnetic spectrum toward the target may include a pulsed emission of the outgoing electromagnetic energy substantially at wavelengths in the second portion of the electromagnetic spectrum as the data is acquired from the global shutter sensor.

An image detection system may be summarized as including a first source communicatively coupled to an output on a global shutter sensor; the first source operable to emit outgoing electromagnetic energy substantially at wavelengths in a first portion of an electromagnetic spectrum toward a target, the first portion of the electromagnetic spectrum consisting essentially of at least one of a blue portion or an ultraviolet portion of the electromagnetic spectrum, inclusive; the global shutter sensor configured to receive incoming electromagnetic energy returned from the target communicatively coupled to at least one switch disposed on an exterior surface of a housing; the global shutter sensor configured to provide a signal via the output to the first source to: emit outgoing electromagnetic energy substantially at wavelengths in the first portion of the electromagnetic spectrum; and acquire data associated with an incoming electromagnetic energy of wavelengths in a second portion of the electromagnetic spectrum incident upon at least one portion of the global shutter sensor, the second portion of the electromagnetic spectrum consisting essentially of at least one of a red portion or an infrared portion of the electromagnetic spectrum, inclusive; and a color filter array including a Bayer filter having: a first portion comprising an aggregate area of at least about 25% of the color filter array area, the first portion configured to block at least a portion of the incoming electromagnetic energy of wavelengths outside of the second portion of the electromagnetic spectrum from the first portion of the global shutter sensor; and a second portion comprising an aggregate area of at least 50% of the color filter array area, the second portion configured to pass all or a portion of the incoming electromagnetic energy of wavelengths within the visible electromagnetic spectrum to a second portion of the global shutter sensor.

The image detection system may further include a wide band source communicatively coupled to the output on the global shutter sensor; the wide band source operable to emit outgoing electromagnetic energy substantially at wavelengths in a third portion of an electromagnetic spectrum toward the target, the third portion of the electromagnetic spectrum consisting essentially of wavelengths from about 380 nanometers (nm) to about 760 nm, inclusive; the global shutter sensor configured to receive incoming electromagnetic energy returned from the target communicatively coupled to at least one switch disposed on an exterior surface of a housing; the global shutter sensor configured to provide a signal via the output to control either of the first source or the wide band source, the signal to: emit outgoing electromagnetic energy substantially at wavelengths in the first portion of the electromagnetic spectrum from the first source or emit outgoing electromagnetic energy substantially at wavelengths in the third portion of the electromagnetic spectrum from the wide band source; and acquire data associated with the incoming electromagnetic energy of wavelengths in the second portion of the electromagnetic spectrum incident upon the at least one portion of the global shutter sensor when the first source emits the outgoing electromagnetic energy, or acquire data associated with the incoming electromagnetic energy of wavelengths in the third portion of the electromagnetic spectrum incident upon the second portion of the global shutter sensor when the wide band source emits the outgoing electromagnetic energy. The image detection system may further include a narrow band source communicatively coupled to the output on the global shutter sensor; the narrow band source operable to emit outgoing electromagnetic energy substantially at wavelengths in the second portion of an electromagnetic spectrum toward the target; the global shutter sensor configured to receive incoming electromagnetic energy returned from the target communicatively coupled to at least one switch disposed on an exterior surface of a housing; the global shutter sensor configured to provide a signal via the output to control either of the first source or the narrow band source, the signal to: emit outgoing electromagnetic energy substantially at wavelengths in the first portion of the electromagnetic spectrum from the first source or emit outgoing electromagnetic energy substantially at wavelengths in the second portion of the electromagnetic spectrum from the narrow band source; and acquire data associated with the incoming electromagnetic energy of wavelengths in the second portion of the electromagnetic spectrum incident upon the at least one portion of the global shutter sensor when the first source or emits the outgoing electromagnetic energy, or acquire data associated with the incoming electromagnetic energy of wavelengths in the second portion of the electromagnetic spectrum incident upon the at least one portion of the global shutter sensor when the narrow band source emits the outgoing electromagnetic energy.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with sources of electromagnetic energy, operative details concerning global shutter sensors and manufacturing details of color filter arrays have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Single Source Reader Overview

Global commerce, international shipping, and increasing worldwide immigration and travel have increased both the number and variety of packages and correspondence handled at post offices worldwide. To provide an ever increasing amount of information on smaller, more convenient and less costly labels, post offices around the world make use of one and two dimensional machine-readable symbols to encode class of service, tracking, routing, and valuation data on parcels and correspondence. Such symbols provide an efficient, standardized and relatively secure method of attaching postage to parcels and correspondence. However, some post offices have adopted the use of specialized media, such as inks that fluoresce when exposed to a specific wavelength of electromagnetic energy, to increase security and reduce the incidence of postal fraud.

Figure 1:
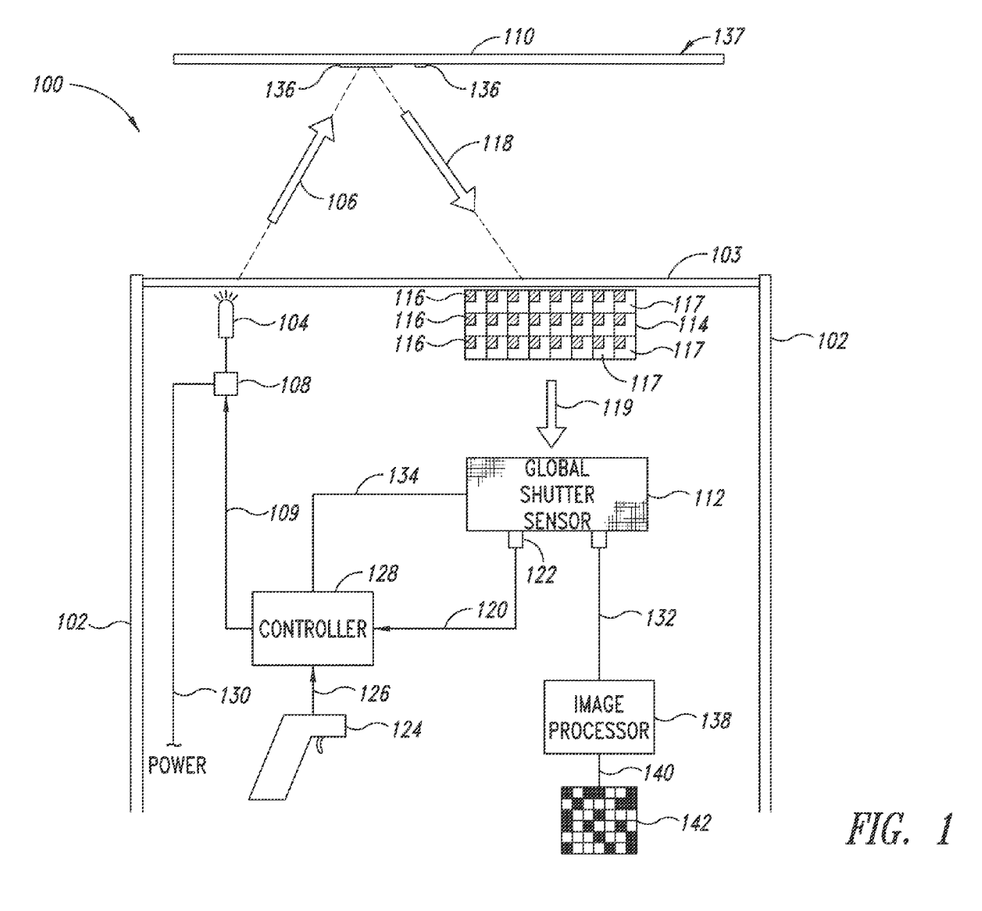
FIG. 1 is a schematic diagram of a machine-readable symbol reader system in use with a substrate bearing a machine-readable symbol, the system including a source operable to emit electromagnetic energy in a first portion of the electromagnetic spectrum, a color filter array, and a global shutter sensor to receive electromagnetic energy in a second portion of the electromagnetic spectrum that differs from the first portion of the electromagnetic spectrum, according to one illustrated embodiment.

FIG. 1 depicts an illustrative reader system 100 adapted to read machine-readable symbols. The reader system 100 can include a first source 104, a global shutter sensor 112, and a color filter array 114, all at least partially disposed within a housing 102. The first source 104 is operable to selectively emit outgoing electromagnetic energy 106 in a first portion of the electromagnetic spectrum toward a target (e.g., substrate, machine readable symbol). The global shutter sensor 112 is positioned to receive, via a color filter array 116, incoming electromagnetic energy 118 in a second portion of the electromagnetic spectrum. The color filter array 116 has a first portion that substantially passes incoming electromagnetic energy in the second portion of the electromagnetic spectrum while substantially limiting the passage of electromagnetic energy at wavelengths outside the second portion of the electromagnetic spectrum.

The reader system 100 can be portable such as battery powered handheld readers or a line powered stationary system such as self service kiosks or sales terminals found in post offices and retail environments. The system can include a housing 102 at least partially enclosing all or a portion of the reader system 100. For example, in some instances, the housing 102 can be a lightweight plastic or metal structure at least partially surrounding the first source 104, the switch 108, the global shutter sensor 112, and the color filter array 114. In some instances, a lens 103 comprising an optically clear or colored lens similar translucent or transparent panel permitting the exit and entry of electromagnetic energy into and out of the housing 102 can cover the first source 104, the global shutter sensor 112 and the color filter array 114.

The first source 104 can include any number of devices or systems capable of emitting outgoing electromagnetic energy 106 in at least a first portion of the electromagnetic spectrum encompassing one or more wavelengths useful for reading a machine-readable symbol 136. The first source 104 is selected based, at least in part, upon the expected operating environment. For example, in environments where rough handling and drops may be expected, the first source 104 may incorporate an impact resistant or ruggedized first source 104 to withstand the rigors of the expected service. In applications where the reader system will be battery powered, selection of a first source 104 having low power consumption characteristics, such as a light emitting diode (LED) may be desirable. In a line powered reader system 100, such as those found in stationary, desktop or kiosk applications, a first source 104 providing greater power output and potentially greater sensitivity, for example a laser-based source, may be desirable.

Although any source capable of emitting outgoing electromagnetic energy 106 within the first portion of the electromagnetic spectrum may be used to provide the first source 104, in a preferred embodiment, the first source 104 includes one or more light emitting diodes (LEDs) providing outgoing electromagnetic energy 106 in a first portion of the electromagnetic spectrum. LEDs are fairly rugged, provide reasonably high output capability in a relatively compact package size, have a relatively long operating life when compared to incandescent and fluorescent sources, and have low power consumption characteristics well suited for use in battery powered reader systems 100. The outgoing electromagnetic energy 106 provided by the first source 104 can fall into any portion of the electromagnetic spectrum extending from about 280 nanometers (nm) to about 1400 nm. However, in a preferred embodiment, the first source 104 can be one or more LEDs capable of emitting outgoing electromagnetic energy 106 in the first portion of the electromagnetic spectrum extending from about 380 nm to about 475 nm (visible blue-violet spectrum); from about 300 nm to about 400 nm (near-ultraviolet spectrum); or from about 300 nm to about 475 nm (near-ultraviolet to visible blue-violet spectrum).

In some embodiments, the first source 104 may be disposed partially or completely upon an exterior surface of the housing 102. In other embodiments, the first source 104 may be disposed within the housing 102 such that the outgoing electromagnetic energy 106 provided by the first source 104 passes through at least a portion of the lens 103. The outgoing electromagnetic energy 106 can be emitted by the first source 104 in the form of either a steady or pulsed emission. For example, where the first source 104 comprises one or more LEDs, power 130 may be continuously supplied to the LEDs resulting in the steady emission of the outgoing electromagnetic energy 106 by the first source 104 (e.g., a single, long duration, pulse). Alternatively, power 130 may be intermittently supplied to the LEDs at regular or irregular intervals resulting in a regular or irregular emission of the outgoing electromagnetic energy 106 from the first source 104 (e.g., a series of regular or irregular, short duration, pulses).

The at least one switch 108 may selectively control or interrupt power 130 supplied to the first source 104. The at least one switch 108 includes any number of devices or systems suitable for controlling or reversibly interrupting power flow 130 to the first source 104. In some embodiments, the at least one switch 108 may be operably coupled directly to an externally accessible actuator 124 such that, when activated, the actuator 124 permits power 130 flow to the first source 104. Alternatively, the at least one switch 108 can be an electrically activated device, for example a relay or solid state electronic device (e.g. MOSFET). Such may be communicably coupled to the either directly or indirectly to the actuator 124, for example via the controller 128.

At times, another device internal to or external from the reader system 100 can partially or completely control the operation of the switch 108. In some embodiments, the actuator 124 can include a partially or completely automated system configured to selectively generate a signal 109 controlling the operation of the at least one switch 108 and permitting the selective emission of outgoing electromagnetic energy by the first source 104. In at least one preferred embodiment, the global shutter sensor 112, can have an output 122 providing a synchronization signal 120, either directly to the at least one switch 108 or indirectly via the controller 128 that is communicatively coupled to the at least one switch 108. Synchronizing the emission of outgoing electromagnetic energy 106 from the first source 104 with a synchronization signal 120 provided by the global shutter sensor 112, advantageously permits the contemporaneous emission of the outgoing electromagnetic energy 106 by the first source 104 as raw image data 132 is acquired from the global shutter sensor 112.

At least a portion of the outgoing electromagnetic energy 106 can fall incident upon a substrate 110 having one or more machine-readable symbols 136 disposed thereupon. The substrate 110 or machine readable symbol 136 may thus constitute a target 137. The machine-readable symbols 136 can include any machine readable image, mark, sign, insignia, device or the like, rendered using one or more inks, toners, or similar substances on a substrate 110 that includes, but is not limited to, a paper substrate, a polymeric plastic substrate, a cloth substrate, or any similar substrate having a surface capable of accepting an ink, toner, or similar medium. In at least some instances, the machine-readable symbols 136 may be partially or completely visually discernable by a human.

In some embodiments all or a portion of the machine-readable symbols 136 can be rendered in one or more inks or toners on a paper substrate. All or a portion of the machine-readable symbol 136 can be rendered in a visible media (e.g., a red ink), an invisible media (e.g., an infrared "IR" ink), or a combination thereof (e.g., a visible ink having IR, UV or fluorescent properties). A non-limiting, illustrative, example is provided through the use of visible red, blue, or black inks or toners to form a machine-readable symbol 136 in the form of a machine-readable symbol that is attached to the substrate 110—such machine-readable symbols 136 may be found, for example, on machine generated labels that are attached to a variety of correspondence, parcels, and packages worldwide.

In some embodiments all or a portion of the machine-readable symbols 136 can be printed in one or more fluorescent medias, for example an ink or other media having fluorescent properties when exposed to at least a portion of the electromagnetic spectrum. A non-limiting, illustrative, example includes one or more machine-readable symbols 136 rendered in a visibly perceptible media that weakly fluoresces in the visible red portion electromagnetic spectrum when illuminated with outgoing electromagnetic energy 106 in the visible blue portion of the electromagnetic spectrum. Such machine-readable symbols may be useful in detecting the use of fraudulently produced postage. In some instances, two or more machine-readable symbols 136 may be used on a single substrate 110. For example, the substrate 110 may contain both a first, visibly perceptible, machine-readable symbol 136 and a second, visibly imperceptible, machine-readable symbol 136 that is the same as or differs from the first symbol, and is discernible only when viewed in a non-visible portion of the electromagnetic spectrum.

At least a portion of the outgoing electromagnetic energy 106 can be returned, by reflection, emission (e.g., fluorescence), or a combination of reflection and emission, from the machine-readable symbol 136, the substrate 110, or both the machine-readable symbol 136 and the substrate 110. The electromagnetic energy reflected or emitted by the substrate 110 or the machine-readable symbol 136 provides at least a portion of the spectral content of the incoming electromagnetic energy 118 directed towards the reader system 100. In some embodiments, the incoming electromagnetic energy 118 can include all or a portion of the electromagnetic spectrum of the outgoing electromagnetic energy 106. For example where a full spectrum, white, LED provides the outgoing electromagnetic energy 110 and the machine-readable symbol 136 is rendered in a red medium, a portion of the red electromagnetic spectrum of the outgoing electromagnetic energy 106 is reflected from the machine-readable symbol 136 and forms a portion of the spectral content of the incoming electromagnetic energy 118.

In a preferred embodiment, at least a portion of the incoming electromagnetic energy 118 can comprise a second portion of the electromagnetic spectrum that differs from the first portion of the electromagnetic spectrum emitted as the outgoing electromagnetic energy 106 by the first source 104. For example, where an LED first source 104 provides outgoing electromagnetic energy 106 in the first portion of the electromagnetic spectrum comprising the visible blue portion of the electromagnetic spectrum, a fluorescent machine-readable symbol 136 can emit electromagnetic energy in second portion of the electromagnetic spectrum (e.g., the visible red electromagnetic spectrum). The second portion of the electromagnetic spectrum forms at least a portion of the incoming electromagnetic energy 118 returned to the reader system 100.

To minimize the likelihood of interference caused by extraneous electromagnetic energy in the ambient environment surrounding the reader system 100, the intensity of the outgoing electromagnetic energy 110 emitted by the first source 104 can be greater than the intensity of the first portion of the electromagnetic spectrum in the ambient environment. Ambient electromagnetic energy having an intensity greater than the intensity of the electromagnetic energy emitted by the first source 104 will detrimentally interfere with the reception of the incoming electromagnetic energy 118 that is reflected or emitted by the machine-readable symbol 136. For example, where the machine-readable symbol 136 is rendered in a fluorescent medium that weakly emits electromagnetic energy in a second portion of the electromagnetic spectrum (e.g. the visible red spectrum), ambient electromagnetic energy within the second portion of the electromagnetic spectrum will detrimentally interfere with the reception by the global shutter sensor 112 of the second portion of the electromagnetic spectrum contained in the incoming electromagnetic energy 118. Emitting at least the first portion of the electromagnetic spectrum at an intensity level greater than the ambient intensity level of the first portion of the electromagnetic spectrum may advantageously produce incoming electromagnetic energy 118 containing the second portion of the electromagnetic spectrum at an intensity level sufficient for the global shutter sensor 112 to discern the machine-readable symbol 136.

At least a portion of the incoming electromagnetic energy 118 passes through the color filter array 114. The color filter array 114 may be disposed behind lens 103 to protect the color filter array from dust, dirt, and damage. The color filter array 114 is disposed proximate the global shutter sensor 112, and in some embodiments may be disposed adjacent to the global shutter sensor 112. In some instances the color filter array 114 may be integrally formed with or bonded to the global shutter sensor 112. The color filter array 114 can include any number of systems, devices or combination of systems and devices suitable for passing at least a portion of the incoming electromagnetic energy 118 to the global shutter sensor 112.

The color filter array 114 can be apportioned into at least a first portion 116 and a second portion 117. The first portion 116 can be a contiguous portion or an aggregate portion comprised of a plurality of non-contiguous portions of the color filter array 114. Similarly, the second portion 117 can be a contiguous portion or an aggregate portion comprised of a plurality of non-contiguous portions of the color filter array 114. Although depicted in FIG. 1 as having only a first portion 116 and a second portion 117, the color filter array 112 may have any number of portions, each having somewhat different transmission characteristics. In a preferred embodiment, the color filter array 114 is arranged as Bayer-pattern filter with the first portion 116 corresponding to a first set of pixels or photodiodes on the surface of the global shutter sensor 112 and the second portion 117 corresponding to a second set of pixels or photodiodes on surface of the global shutter sensor 112.

The first portion 116 of the color filter array 114 transmits or provides passage for at least a portion of the incoming electromagnetic energy 118 within the second portion of the electromagnetic spectrum. For example, the first portion 116 of the color filter array 114 can transmit substantially all of the red or near-infrared portions of the incoming electromagnetic energy 118 when the second portion of the electromagnetic spectrum comprises the red or near-infrared portion of the electromagnetic spectrum. The first portion 116 of the color filter array 114 can limit the passage of portions of the incoming electromagnetic energy 118 that lie outside of the second portion of the electromagnetic spectrum. Continuing with the previous example, the first portion 116 of the color filter array 114 can limit the passage of portions of the incoming electromagnetic energy 118 that lie outside the red or near-infrared portions when the second portion of the electromagnetic spectrum comprises the red or near-infrared portion of the electromagnetic spectrum.

The second portion 117 of the color filter array 114 transmits or provides passage for all or a portion of the incoming electromagnetic energy 118. In some instances, the second portion 117 of the color filter array 114 transmits substantially all of the spectral content of the incoming electromagnetic energy 118, including the second portion of the electromagnetic spectrum. In other instances, the second portion 117 of the color filter array 114 transmits substantially all of the spectral content of the incoming electromagnetic energy 118 except the second portion of the electromagnetic spectrum. In yet other instances, the second portion 117 of the color filter array 114 transmits only a portion of the spectral content of the incoming electromagnetic energy 118 that lies outside of the second portion of the electromagnetic spectrum.

In a preferred embodiment, the first portion 116 of the color filter array 114 transmits substantially all of the spectral content of the second portion of the electromagnetic spectrum comprising incoming electromagnetic energy 118 within the visible red spectrum (from about 640 nm to about 750 nm), the near-infrared spectrum (from about 750 nm to about 1400 nm) or any combination of the red and near-infrared spectrums (from about 640 nm to about 1400 nm), while the second portion 117 of the color filter array 114 transmits the substantially all of the visible spectral content of the incoming electromagnetic energy 118 (i.e., from about 360 nm to about 780 nm).

A preferred configuration for the color filter array 114 is a Bayer pattern filter configuration using a Red/Clear/Clear/Clear (RC/CC) pattern that transmits or permits the passage of the second portion of the electromagnetic spectrum (i.e., the red, near-infrared, or combinations thereof) through approximately 25% of the aggregate color filter array area (i.e., the red portions of the Bayer pattern) and transmits or permits the passage of at least the remaining portion of the visible electromagnetic spectrum through approximately 75% of the aggregate color filter array area (i.e., the clear portions of the Bayer pattern). The use of a modified Bayer-pattern filter is advantageous in that a suitable RC/CC Bayer pattern filter may be produced using conventional Bayer pattern (RG/GB) filter manufacturing techniques and omitting the blue and green portions of the pattern during the production process. A Bayer-pattern filter having an incomplete Red/Clear/Clear/Red (RC/CR) pattern permitting the passage of the second portion (i.e. the red portion) of the electromagnetic spectrum through approximately 50% of the aggregate filter area and passage of at least a portion of the remaining electromagnetic spectrum through approximate 50% of the aggregate filter area may also be used as the color filter array 114. Although specifically discussed in detail with respect to a Bayer-pattern filter, other color filter arrays apportioned or apportionable into a first portion 116 and a second portion 117 may be used in conjunction with appropriate modifications to the global shutter sensor 112 to discriminate between incoming electromagnetic energy 118 transmitted by the first portion 116 and the second portion 117 of the color filter array 114.

At least a portion 119 of the incoming electromagnetic energy 118 is substantially transmitted by or passes through the color filter array 114 and falls incident upon the global shutter sensor 112. The global shutter sensor 112 can include an array comprising for example, about 1 million to about 50 million photodiodes or pixels configured to capture at least a portion of the electromagnetic energy incident upon the global shutter sensor and to provide an output proportionate to the intensity and/or color of the incident electromagnetic energy on each respective photodiode or pixel forming the array. In some instances, a global shutter sensor 112 capable of capturing incoming electromagnetic energy 118 within all or a portion of the electromagnetic spectrum of from about 280 nanometers (nm) to about 1400 nm may be used (i.e., near-ultraviolet+visible+near-infrared electromagnetic spectrum). In other instances, a global shutter sensor 112 capable of capturing incoming electromagnetic energy 118 within all or a portion of the electromagnetic spectrum of from about 390 nm to about 1400 nm may be used (i.e., visible+near-infrared electromagnetic spectrum). In yet other instances, a global shutter sensor 112 capable of capturing incoming electromagnetic energy 118 within all or a portion of the visible electromagnetic spectrum of from about 390 nm to about 760 nm may be used (i.e., visible spectrum).

The use of a global shutter sensor 112 to capture image data within the incoming electromagnetic energy 118 provides advantages over the use of a conventional or rolling image sensor. Conventional or rolling image sensors use a scanning pattern to acquire data from the pixels or photodiodes forming the image sensor. The use of a scanning pattern imparts a time lag or delay between the time data is transferred from the first pixel or photodiode in the sensor array to the time data is transferred from the last pixel or photodiode in the sensor array. In contrast, the global shutter sensor 112 is able to simultaneously acquire raw image data 132 from all of the pixels or photodiodes forming the global shutter sensor 112 without any transfer lag. Simultaneous or near simultaneous acquisition of the data from all of the pixels or photodiodes forming the global shutter sensor 112 advantageously permits the brief high intensity illumination of the machine-readable symbols 136 on the substrate 110 using the first source 104 while the raw image data 132 is acquired by the global shutter sensor 112. By limiting the duration that the first source 104 is maintained at a high intensity level, the operating life of the first source 104 is extended and the power demand imposed by the first source 104 is reduced, making practical the use of battery powered or rechargeable reader systems 100.

The outgoing electromagnetic energy 106 may be provided as a single constant-level emission by the first source 104 (i.e., a single, long duration, pulse having a constant intensity) as the raw image data 132 is acquired from the global shutter sensor 112. Alternatively, the outgoing electromagnetic energy 106 may be provided as a variable-level emission by the first source 104 (i.e., a series of short duration pulses, each pulse having the same or different intensity) as the raw image data 132 is acquired from the global shutter sensor 112. The raw image data 132 acquired by the global shutter sensor 112 can be communicated to an image processor 138 where one or more machine executable instruction sets can be used to extract the machine-readable symbol image 142 from the raw image data 132.

In some embodiments, the machine-readable symbol image 142 is extracted from the raw image data 132 associated with the incoming electromagnetic energy 118 passed through the first portion 116 of the color filter array 114 and captured by the global shutter sensor 112. In other embodiments, the machine-readable symbol image 142 is extracted from the raw image data 132 associated with the incoming electromagnetic energy 118 transmitted by the second portion 117 of the color filter array 114 and captured by the global shutter sensor 112. In yet other embodiments, the machine-readable symbol image 142 is extracted from the raw image data 132 associated with the incoming electromagnetic energy 118 transmitted by both the first portion 116 and the second portion 117 of the color filter array 114 and captured by the global shutter sensor 112.

For example, where the first source 104 emits outgoing electromagnetic energy 106 in the first portion of the electromagnetic spectrum comprising the visible blue portion of the electromagnetic spectrum, and the outgoing electromagnetic energy 106 is used to illuminate a fluorescent machine-readable symbol 136 that weakly emits within the second portion of the electromagnetic spectrum comprising a visible red portion of the electromagnetic spectrum, the incoming electromagnetic energy 118 incident upon the second portion 117 of the color filter array 114 tends to wash out (i.e., detrimentally interfere with the reception of) the second portion of the electromagnetic spectrum contained in the incoming electromagnetic energy 118. In this instance, the image 142 of the machine-readable symbol is recoverable principally from those pixels or photodiodes proximate only the first portion 116 of the color filter array 114 that permit only the passage of second portion of the electromagnetic spectrum (i.e., the visible red portion of the electromagnetic spectrum) of the incoming electromagnetic energy 118. The raw image data 132 communicated from the global shutter sensor 112 to the image processor 138 can be demosaiced, processed, or otherwise recovered within the image processor 138 to generate image data 140 providing the machine-readable symbol image 142.

In at least some embodiments, the global shutter sensor 112 has at least one output 122 configured to provide a synchronization signal 120 that is useful in synchronizing one or more events with the acquisition of raw image data 132 by the global shutter sensor 112. In some instances, the synchronization signal 120 provided by the global shutter sensor 112 can be used as an input to the controller 128. Responsive to the receipt of the synchronization signal 120 from the global shutter sensor 112, the controller 128 can transmit signal 109 to close switch 108 causing the first source 104 to emit outgoing electromagnetic energy 106; and, signal 134 to instruct the global shutter sensor 112 to acquire the raw image data 132. In some alternative embodiments, the output 122 can be communicably coupled directly or indirectly to the switch 108 such that the synchronization signal 120 closes switch 108, causing the first source 104 to emit outgoing electromagnetic energy 106 as raw image data 132 is acquired by the global shutter sensor 112.

Direct (e.g., via output of the synchronization signal 120 to the switch 108) or indirect (e.g., via output of the synchronization signal 120 to the controller 128) synchronization of the global shutter sensor 112 with the emission of outgoing electromagnetic energy 106 by the first source 104 advantageously permits limiting the flow of power 130 to the first source 104 for only the duration required to acquire the raw image data 132 from the global shutter sensor 112. However, even though short in duration, the first source 104 may be subjected to a relatively high power flow to provide outgoing electromagnetic energy 106 at a level sufficient to enable resolution of the machine readable symbol 136 by the global shutter sensor 112. To further protect and to extend the life of the first source 104, power 130 may be supplied to the first source 104 as a series of relatively high-power, short duration, pulses rather than as a single high-power, long duration pulse.

The image processor 138 can include a microprocessor, digital signal processor, application specific integrated circuit (ASIC), programmable gate array ("PGA"), programmable logic controller ("PLC") or similar device able to execute a machine executable instruction set. The image processor 138 can be disposed locally within the symbol reader 100 or remote from the symbol reader 100, for example within a local or network connected computing device (not shown). The image processor 138 can extract the machine-readable symbol image 142 from the raw image data 132 transmitted by the global shutter sensor 112. The image processor 138 can execute a number of image extraction algorithms dependent upon the type of color filter array 114 and the type of global shutter sensor 112 providing the raw image data 132. At times, the image processor 138 may use only a portion of the raw image data 132 provided by the global shutter sensor 112, for example the image processor 138 may extract and use only raw image data 132 generated only by the portion of the global shutter sensor 112 that is proximate the first portion 116 of the color filter array 114 to provide the machine-readable symbol image 142. At other times, the image processor 138 may use only image data 132 generated by the global shutter sensor 112 that is proximate the second portion 117 of the color filter array 114 to provide the machine-readable symbol image 142. At other times, the image processor 138 may use image data 132 generated by the global shutter sensor 112 proximate both the first portion 116 and the second portion 117 of the color filter array 114 to provide the machine-readable symbol image 142.

Although depicted as individual elements in FIG. 1, and although described in the context of individual elements, the image processor 138 may be logically or physically incorporated in whole or in part within the controller 128. Alternatively, controller 128 may be logically or physically incorporated in whole or in part within the image processor 138. Additionally, the global shutter sensor 112 may logically or physically incorporate in whole or in part the controller 128, the image processor 138 or both the controller 128 and the image processor 138.

Multiple Source Reader Overview

Although described above in the context of a single machine-readable symbol, in many instances, multiple types or styles of machine-readable symbols may be encountered. For example, in parcel handling or postal service, machine-readable symbols produced by shippers or post offices around the world may be encountered. Such labels may include a printed red machine-readable symbol on a white substrate from one post office, a printed blue machine-readable symbol on a white substrate from a second post office, or a printed black machine-readable symbol on a white substrate from home printed postage. However, the use of specialty media in rendering machine-readable symbols used in commerce and postal systems worldwide continues to increase. For example, a single post office may encounter machine-readable symbols printed in an ultraviolet sensitive fluorescent media as well as machine-readable symbols printed in a conventional red ink on white substrate. Provision of multiple machine-readable symbol readers within a single device advantageously increases the flexibility of reader systems and improves overall package and letter handling productivity since time is not spent switching from a first reader device configured for a first symbol type to a second reader device configured for a second symbol type.

Figure 2:
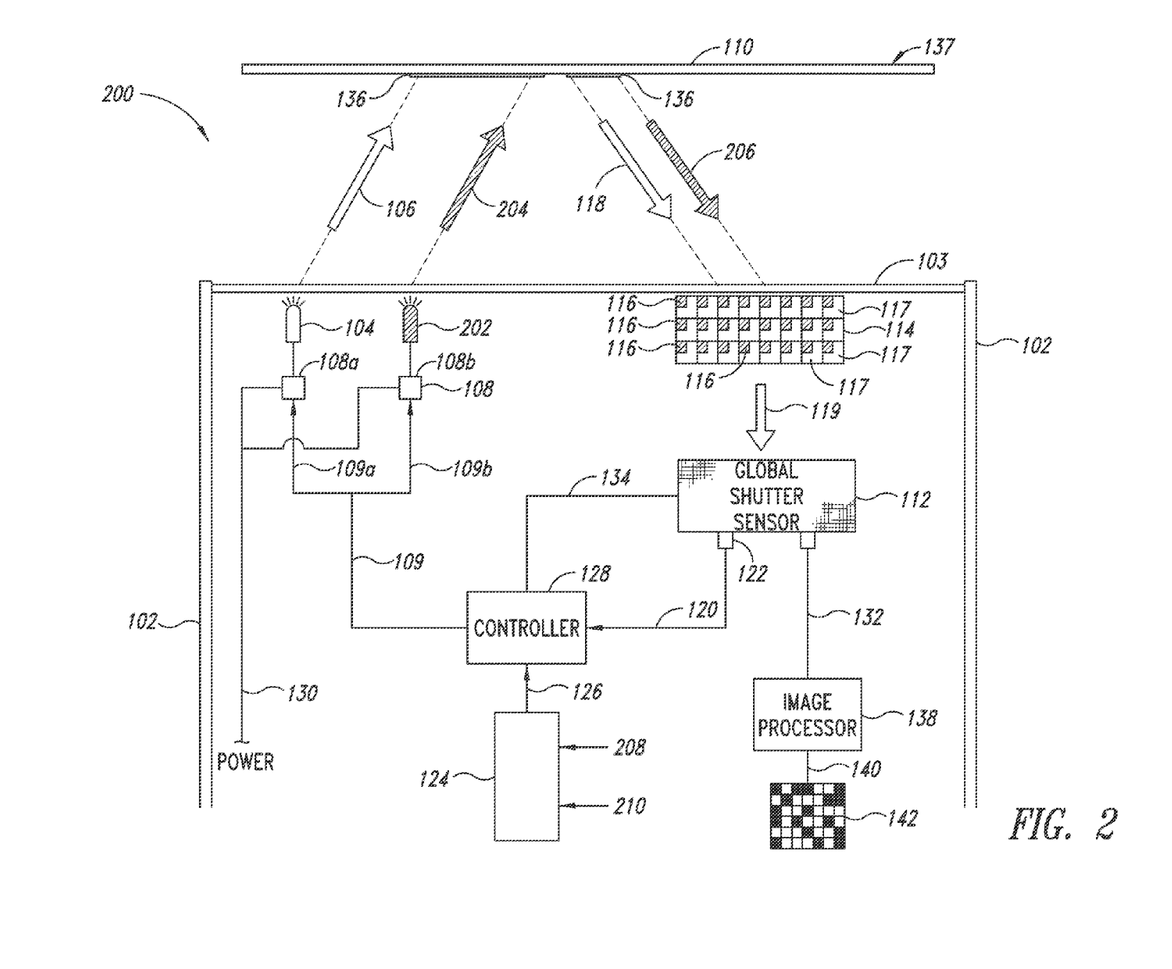
FIG. 2 is a schematic diagram of a machine-readable symbol reader system in use with a substrate bearing a machine-readable symbol, the system including a first source operable to emit electromagnetic energy in a first portion of the electromagnetic spectrum, another source operable to emit electromagnetic energy at least in a different portion of the electromagnetic spectrum, a color filter array, and a global shutter sensor to receive incoming electromagnetic energy, according to one illustrated embodiment.

FIG. 2 depicts an illustrative reader system 200 adapted to read at least two different machine-readable symbols 136. In addition to the various components, systems and devices described in detail above with respect to FIG. 1, the reader system 200 can additionally include another source 202 selectively operable to emit outgoing electromagnetic energy 204 comprising an electromagnetic spectrum that differs at least in part from the electromagnetic spectrum emitted by the first source 104. Outgoing electromagnetic energy 106, 204 can be emitted by either the first source 104 or the source 202, respectively. In some embodiments, the actuator 124 provides at least one user (i.e., manual) input permitting the selective emission of outgoing electromagnetic energy by the first source 104, the source 202 or both the first source 104 and the source 202. In other embodiments, the actuator 124 can include a partially or completely automated system, internal to or external from the reader system 200, capable of generating a signal causing the selective emission of outgoing electromagnetic energy by the first source 104, source 202 or both the first source 104 and source 202.

In some embodiments, the source 202 is a wideband source capable of emitting outgoing electromagnetic energy 204 in a portion of the electromagnetic spectrum comprising: at least 50 nanometers (nm) of spectral width; at least 100 nm of contiguous spectral width; at least 200 nm of contiguous spectral width; or at least 400 nm of contiguous spectral width. In other embodiments, the source 202 is a narrowband source capable of emitting outgoing electromagnetic energy 204 in a portion of the electromagnetic spectrum comprising: at most 400 nm of contiguous spectral width; at most 200 nm of contiguous spectral width; at most 100 nm of contiguous spectral width; or at most 50 nm of contiguous spectral width. Regardless of whether source 202 is a narrowband or wideband source, in some embodiments, at least a portion of the electromagnetic spectrum of the outgoing electromagnetic energy 206 may overlap the first portion of the electromagnetic spectrum of the outgoing electromagnetic energy 106 provided by the first source 104. Although a reader system 200 having two sources 104, 202 will be described in detail herein for brevity and conciseness, those of skill in the art can readily appreciate that three or more sources may be incorporated within additional embodiments.

In addition to the first source 104 described in detail above, the reader system 200 can also have an additional source 202. In some embodiments, a number of switches 108A, 108B (hereinafter, collectively "108" unless a specific reference is provided) may be communicably coupled to the controller 128, a power supply 130 and each of the sources 104, 202, respectively. The controller 128 can cause power 130 to flow to either or both the first source 104 or the source 202 via signals 109A, 109B, respectively (hereinafter, collectively "109" unless a specific reference is provided). As a consequence the first source will emit outgoing electromagnetic energy 106 in the first portion of the electromagnetic spectrum or the source 202 will emit outgoing electromagnetic energy 204. In some embodiments, the controller 128 can selectively cause the emission of outgoing electromagnetic energy 106 from the first source 104 and not source 202 by transmitting a signal 109A that closes only switch 108A. In other embodiments, the controller 128 selectively causes the emission of the outgoing electromagnetic energy 204 from source 202 and not the first source 104 by transmitting a signal 109B that closes only switch 108B. In yet other embodiments, the controller 128 can cause the emission of outgoing electromagnetic energy 106 within the first portion of the electromagnetic spectrum by the first source 104 and outgoing electromagnetic energy 206 by the second source 202 by transmitting a signal 109 that closes both switches 108.

The source 202 emits outgoing electromagnetic energy 204 at least in a different portion of the electromagnetic spectrum than the first portion of the electromagnetic spectrum in the outgoing electromagnetic energy 106 emitted by the first source 104. In some embodiments, the source 202 is a wideband source 204 emitting outgoing electromagnetic energy 204 in an electromagnetic spectrum at least a portion of which may overlap the electromagnetic spectrum of the electromagnetic energy 106 emitted by the first source 104. When source 202 is a wideband source, the outgoing electromagnetic energy 204 emitted by the source 202 can include an electromagnetic spectrum comprising wavelengths of from about 280 nanometers (nm) to about 1400 nm; about 300 nm to about 1100 nm; about 340 nm to about 900 nm; or about 380 nm to about 760 nm.

In other embodiments, the source 202 is a narrowband source emitting outgoing electromagnetic energy 204 having an electromagnetic spectrum which does not overlap the first portion of the electromagnetic spectrum of the outgoing electromagnetic energy emitted by the first source 104. When source 202 is a narrowband source, the outgoing electromagnetic energy 204 emitted by the source 202 can include an electromagnetic spectrum comprising wavelengths of from about 640 nm to about 780 nm (visible red electromagnetic spectrum); about 640 nm to about 1040 nm (visible red+near-infrared electromagnetic spectrum); or about 1040 nm to about 1400 nm (near-infrared electromagnetic spectrum). Regardless of the type of source 202 used, a portion of the outgoing electromagnetic energy 204 emitted by the source will be reflected by or otherwise returned from the machine-readable symbol 136.

In one embodiment, the source 202 can be a wideband source such as a white light emitting diode (LED) that provides outgoing electromagnetic energy 204 across substantially all of the visible electromagnetic spectrum. The machine-readable symbol 136 can include a visible red, blue, or black machine-readable symbol on a white or similar light colored background. In such an instance, the incoming electromagnetic energy 206 may include no electromagnetic spectral content associated with the lack of reflection of a portion of the outgoing electromagnetic energy 204 by the machine-readable symbol 136 (for a black machine-readable symbol); reflected incoming electromagnetic energy 206 containing spectral content within the red electromagnetic spectrum associated with the reflection of a portion of the outgoing electromagnetic energy 204 by the machine-readable symbol 136 (for a red machine-readable symbol); or reflected incoming electromagnetic energy 206 containing spectral content within the blue electromagnetic spectrum associated with the reflection of a portion of the outgoing electromagnetic energy 204 by the machine-readable symbol 136 (for a blue machine-readable symbol).

In another instance, the source 202 can be a narrowband source such as a red or infrared emitting LED that provides outgoing electromagnetic energy 204 in the red, near-infrared, or a combination of red and near-infrared electromagnetic spectrum (i.e., the second portion of the electromagnetic spectrum described in detail with regard to the first source 104, above). The machine-readable symbol 136 can include a blue, black, or infrared rendered symbol. In some instances, the incoming electromagnetic energy 206 returned to the reader system 200 may include no electromagnetic spectral content due to the lack of reflection of a portion of the outgoing electromagnetic energy 204 from a machine-readable symbol 136 rendered in blue or black. In other instances, the incoming electromagnetic energy 206 returned to the reader system 200 may include spectral content in the near-infrared electromagnetic spectrum due to the reflection of a portion of the outgoing electromagnetic energy 204 from an infra-red rendered machine-readable symbol 136.

In some instances, the actuator 124 can include two inputs 208, 210 (e.g., user activated controls depicted in FIG. 2) generating at least input 126 to the controller 128. The at least one input 126 causes the selective emission of outgoing electromagnetic energy 106 in a first portion of the electromagnetic spectrum by the first source 104 or the selective emission of outgoing electromagnetic energy 204 by the source 202. In some instances, input 208 causes the emission of outgoing electromagnetic energy 106 within the first portion of the electromagnetic spectrum by the first source 104 while the source 202 does not emit any outgoing electromagnetic energy 204. Conversely, in other instances, input 210 causes the emission of outgoing electromagnetic energy 204 by source 202. The contemporaneous supply of both inputs 208, 210 can cause the simultaneous emission of outgoing electromagnetic energy 106, 204 from both the first source 104 and the source 202, respectively. The input 126 provided to the controller 128 identifies the source 104, 202 of the outgoing electromagnetic energy. In other instances, the actuator 124 may include an input 208 designating either the first source 104 or the source 202 as emitting the outgoing electromagnetic energy 106, 204, respectively, and an input 210 causing the selective emission of the outgoing electromagnetic energy from the designated source.

The controller 128 coordinates the acquisition of raw image data 132 from the global shutter sensor 112 as the outgoing electromagnetic energy 106, 204 is contemporaneously emitted by the first source 104 or the source 202, respectively, as either a single, long duration, pulse or a series of short duration pulses. In at least some embodiments, the controller 128 may also coordinate the subsequent processing of the raw image data 132 by the image processor 138. When the first source 104 is used to provide the outgoing electromagnetic energy 106, the controller 128 can provide a signal 134 to the global shutter sensor 112 to acquire raw image data 132 contemporaneous with the emission of the outgoing electromagnetic energy 106 by the first source 104. The machine-readable symbol image 142 can be extracted by the image processor 138 from the raw image data 132 acquired from the global shutter sensor 112 based only upon the incoming electromagnetic energy 118 transmitted by the first portion 116 of the color filter array 114. When the source 202 is used to provide the outgoing electromagnetic energy 204, the controller 128 can provide a signal 134 to the global shutter sensor 112 to acquire raw image data 132 contemporaneous with the emission of the outgoing electromagnetic energy 204 by the source 202. The machine-readable symbol image 142 can be extracted by the image processor 138 from the raw image data 132 acquired from the global shutter sensor 112 based only upon the incoming electromagnetic energy 118 transmitted by the second portion 117 of the color filter array 114.

In one preferred embodiment, the first source 104 is an LED that emits outgoing electromagnetic energy 106 in a first portion of the electromagnetic spectrum comprising the visible blue portion of the electromagnetic spectrum, the near-ultraviolet portion of the electromagnetic spectrum, or both the blue and the near-ultraviolet portions of the electromagnetic spectrum and the source 202 is a white wideband LED source that emits outgoing electromagnetic energy 204 in a wideband electromagnetic spectrum substantially encompassing the visible portion of the electromagnetic spectrum. At least a portion of the incoming electromagnetic energy 206 returned to the reader system 200 comprises spectral content reflected from or emitted by the substrate 110, the machine-readable symbol 136, or both. The incoming electromagnetic energy 206 is transmitted by both the first portion 116 and the second portion 117 of the color filter array 114 and falls incident upon the global shutter sensor 112.

Based on receipt of the signal 134 and contemporaneous with the emission of the outgoing wideband electromagnetic energy 204 by the source 202, raw image data 132 is acquired from the global shutter sensor 112. The machine-readable symbol image 142 is extracted from the raw image data 132 acquired from the global shutter sensor 112 based only upon the portion of the incoming electromagnetic energy 206 transmitted by the second portion 117 of the color filter array 114. Alternatively, the machine-readable symbol image 142 may be extracted from the raw image data 132 acquired from the global shutter sensor 112 based upon the incoming electromagnetic energy 206 transmitted by both the first portion 116 and the second portion 117 of the color filter array 114.

In yet another preferred embodiment, the first source 104 is an LED that emits outgoing electromagnetic energy 106 in a first portion of the electromagnetic spectrum comprising the visible blue portion of the electromagnetic spectrum, the near-ultraviolet portion of the electromagnetic spectrum, or both the blue and the near-ultraviolet portions of the electromagnetic spectrum and the source 202 is a red narrowband LED source that emits outgoing electromagnetic energy 204 in a narrowband electromagnetic spectrum substantially encompassing the visible red portion of the electromagnetic spectrum. At least a portion of the incoming electromagnetic energy 206 returned to the reader system 200 comprises spectral content reflected from or emitted by the substrate 110, the machine-readable symbol 136, or both. The incoming electromagnetic energy 206 is transmitted by both the first portion 116 and the second portion 117 of the color filter array 114 and falls incident upon the global shutter sensor 112.

Based on receipt of the signal 134 and contemporaneous with the emission of the outgoing wideband electromagnetic energy 204 by the source 202, raw image data 132 is acquired from the global shutter sensor 112. The machine-readable symbol image 142 is extracted from the raw image data 132 acquired from the global shutter sensor 112 based upon only the incoming electromagnetic energy 206 transmitted by the second portion 117 of the color filter array 114. Alternatively, the machine-readable symbol image 142 can be extracted from the raw image data 132 acquired from the global shutter sensor 112 based upon the incoming electromagnetic energy 206 transmitted by both the first portion 116 and the second portion 117 of the color filter array 114.

In yet another preferred embodiment, the first source 104 is an LED that emits outgoing electromagnetic energy 106 in a first portion of the electromagnetic spectrum comprising the visible blue portion of the electromagnetic spectrum, the near-ultraviolet portion of the electromagnetic spectrum, or both the blue and the near-ultraviolet portions of the electromagnetic spectrum and the source 202 is a red or near-infrared narrowband LED source that emits outgoing electromagnetic energy 204 in a narrowband electromagnetic spectrum substantially encompassing the visible red portion of the electromagnetic spectrum, the near-infrared portion of the electromagnetic spectrum, or both the visible red and the near-infrared portions of the electromagnetic spectrum. At least a portion of the incoming electromagnetic energy 206 returned to the reader system 200 comprises spectral content reflected from or emitted by the substrate 110, the machine-readable symbol 136, or both. The incoming electromagnetic energy 206 is transmitted by both the first portion 116 and the second portion 117 of the color filter array 114 and falls incident upon the global shutter sensor 112.

Based on receipt of the signal 134 and contemporaneous with the emission of the outgoing wideband electromagnetic energy 204 by the source 202, raw image data 132 is acquired from the global shutter sensor 112. The machine-readable symbol image 142 is extracted from the raw image data 132 acquired from the global shutter sensor 112 based upon only the incoming electromagnetic energy 206 transmitted by the first portion 117 of the color filter array 114. Alternatively, the machine-readable symbol image 142 can be extracted from the raw image data 132 acquired from the global shutter sensor 112 based upon the incoming electromagnetic energy 206 transmitted by both the first portion 116 and the second portion 117 of the color filter array 114.

Figure 3:
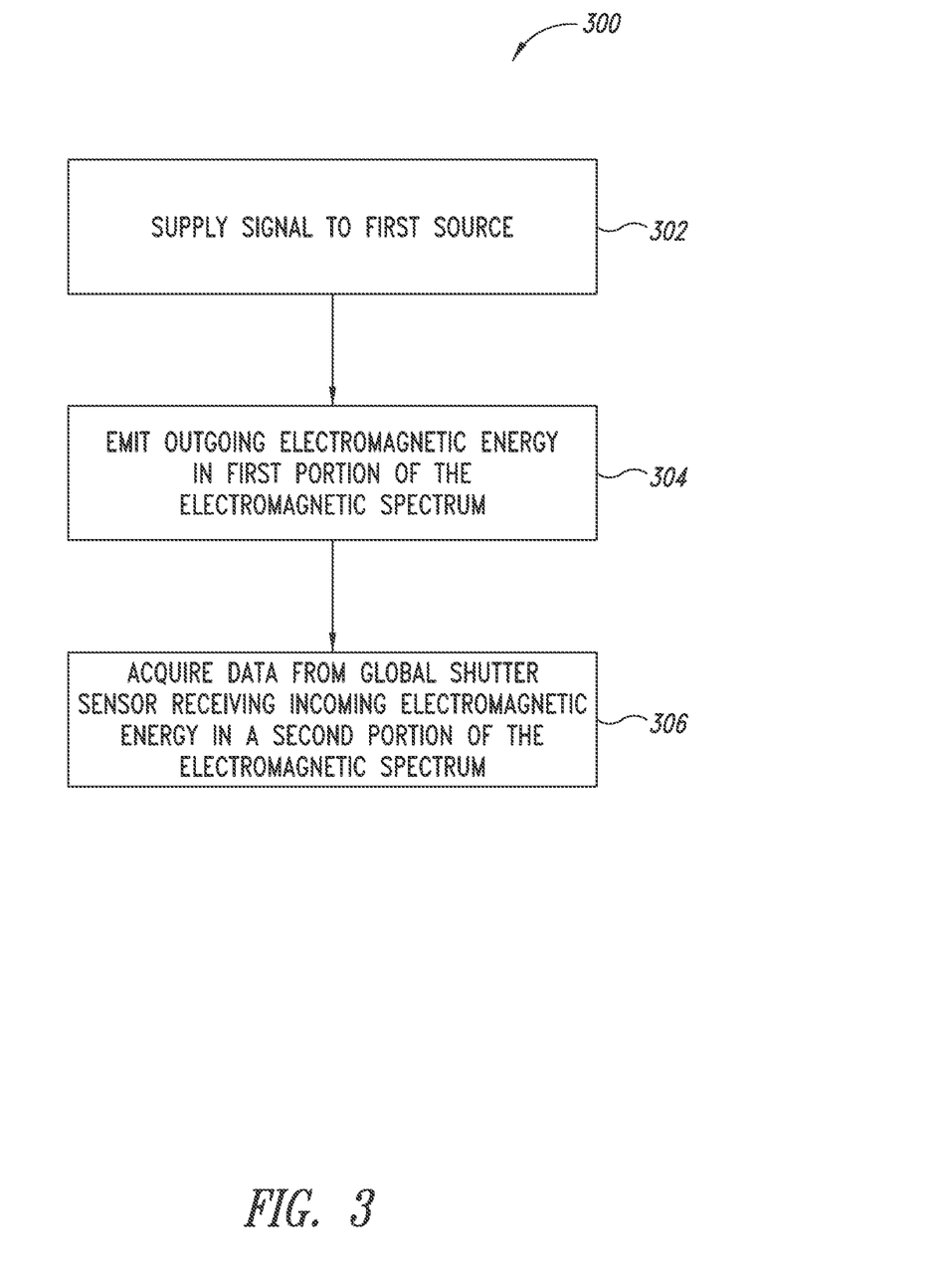
FIG. 3 is a logic flow diagram of a method of operation of a machine-readable symbol reader system using a source operable to emit electromagnetic energy in a first portion of the electromagnetic spectrum and a global shutter sensor to receive electromagnetic energy in a second portion of the electromagnetic spectrum that differs from the first portion of the electromagnetic spectrum, according to one illustrated embodiment.

FIG. 3 depicts an illustrative method 300 for reading a substrate 110 comprising at least one machine-readable symbol 136. The method 300 can include supplying a signal 109 to control the emission of electromagnetic energy 106 from at least a first source 104. In some embodiments, the signal 109 is provided by a controller 128 to a switch 108 controlling the flow of power 130 to the first source 104. In other embodiments, the signal 120 can be provided by a global shutter sensor output 122 to the switch 108 controlling the flow of power 130 to the first source 104.

Responsive to the supply of the control signal to the switch 108, outgoing electromagnetic energy 106 comprising at least a first portion of the electromagnetic spectrum is emitted by the first source 104, as either a single long duration pulse or a series of short-duration pulses, toward a target 137 at 304. The wavelength of the outgoing electromagnetic energy 106 is determined by the first source 104. In one or more preferred embodiments, the first source 104 is a light emitting diode source configured to provide the outgoing electromagnetic energy 106 at wavelengths substantially within a first portion of the electromagnetic spectrum comprising: the visible blue portion of electromagnetic spectrum, the near-ultraviolet portion of the electromagnetic spectrum, or both the blue and the near-ultraviolet portions of the electromagnetic spectrum.

At least a portion of the outgoing electromagnetic energy 106 emitted by the first source 104, as either a single long duration pulse or a series of short-duration pulses, falls incident upon the substrate 110 and the machine-readable symbol 136 disposed thereupon. In some embodiments, the substrate 110, the machine-readable symbol 136 or both the substrate 110 and the machine-readable symbol 136 reflect or otherwise emit (e.g., fluoresce) at least a portion of the outgoing electromagnetic energy 106 to provide the incoming electromagnetic energy 118. At times, the machine-readable symbol 136 can absorb a portion of the incident outgoing electromagnetic energy 106 and emit electromagnetic energy in a second portion of the electromagnetic spectrum. The emitted electromagnetic energy returned then forms a portion of the spectral content of the incoming electromagnetic energy 118 in combination with any electromagnetic energy reflected or otherwise emitted by the substrate 110, the machine-readable symbol 136, or both the substrate 110 and the machine-readable symbol 136.

All or a portion of the machine-readable symbol 136 may be printed or otherwise rendered using a material displaying fluorescent properties when exposed to incident electromagnetic energy in the first portion of the electromagnetic spectrum, for example the blue or near-ultraviolet portions of the electromagnetic spectrum. All or a portion of the machine-readable symbol 136 may be printed using an ink that weakly fluoresces within a second portion of the electromagnetic spectrum, for example, the red or near-infrared electromagnetic spectrum when exposed to incident electromagnetic energy in the blue or ultraviolet electromagnetic spectrum. The weak red emission from the machine-readable symbol 136 is returned as a portion of the spectral content of the incoming electromagnetic energy 118.

Responsive to emitting the outgoing electromagnetic energy 106 towards the substrate 110 raw image data 132 is acquired from the global shutter sensor 112 at 306. The global shutter sensor 112 receives the incoming electromagnetic energy 118 through a color filter array 114 having a first portion 116 that substantially transmits the incoming electromagnetic energy 118 at wavelengths in the second portion of the electromagnetic spectrum while limiting the transmission of incoming electromagnetic energy 118 at wavelengths outside the second portion of the electromagnetic spectrum. The first portion 116 of the color filter array 114 may transmit incoming electromagnetic energy 118 at wavelengths in the visible red or near-infrared electromagnetic spectrum while limiting the transmission of incoming electromagnetic energy 118 outside of the red or near-infrared portions of the electromagnetic spectrum.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) or programmable gate arrays. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Various methods and/or algorithms have been described. Some or all of those methods and/or algorithms may omit some of the described acts or steps, include additional acts or steps, combine acts or steps, and/or may perform some acts or steps in a different order than described. Some of the method or algorithms may be implemented in software routines. Some of the software routines may be called from other software routines. Software routines may execute sequentially or concurrently, and may employ a multi-threaded approach.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of nontransitory signal bearing media include, but are not limited to, the following: recordable type media such as portable disks and memory, hard disk drives, CD/DVD ROMs, digital tape, computer memory, and other non-transitory computer-readable storage media.

The various embodiments described above can be combined to provide further embodiments. All of the commonly assigned US patent application publications, US patent applications, foreign patents, foreign patent applications and non-patent publications referred to in this specification and/or listed in the Application Data Sheet, including but not limited to U.S. provisional patent application Ser. No. 61/647,430 filed is incorporated herein by reference, in its entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A machine-readable symbol reader, comprising:
a housing;
a first source operable to emit outgoing electromagnetic energy substantially at wavelengths in a first portion of an electromagnetic spectrum, out of the housing toward a target, the first portion of the electromagnetic spectrum consisting essentially of at least one of a blue portion or an ultraviolet portion of the electromagnetic spectrum, inclusive;
at least one switch coupled to control at least the first source to selectively cause the first source to emit the outgoing electromagnetic energy substantially at wavelengths in the first portion of the electromagnetic spectrum;

a global shutter sensor positioned in the housing to receive incoming electromagnetic energy returned from the target; and a color filter array disposed in the housing relative to the global shutter sensor to filter the incoming electromagnetic energy, the color filter array including at least a first portion of which substantially passes incoming electromagnetic energy of wavelengths in a second portion of the electromagnetic spectrum to at least one portion of the global shutter sensor and which first portion substantially limits the passage of incoming electromagnetic energy of wavelengths outside of the second portion of the electromagnetic spectrum to the global shutter sensor, the second portion of the electromagnetic spectrum consisting essentially of at least one of a red portion or an infrared portion of the electromagnetic spectrum, inclusive; and a wide band source operable to emit outgoing electromagnetic energy substantially at wavelengths in a third portion of the electromagnetic spectrum out of the housing toward the target, the third portion of the electromagnetic spectrum consisting essentially of wavelengths from about 380 nanometers (nm) to about 760 nm, wherein:

the at least one switch is coupled to control at least the wide band source to selectively emit the outgoing electromagnetic energy of wavelengths substantially in the third portion of the electromagnetic spectrum, and the at least one switch selectively controls the wide band source to not emit the outgoing electromagnetic energy of wavelengths substantially in the third portion of the electromagnetic spectrum when the first source emits the outgoing electromagnetic energy of wavelengths substantially in the first portion of the electromagnetic spectrum;

the filter includes at least a second portion that substantially passes incoming electromagnetic energy having wavelengths in the third portion of the electromagnetic spectrum to at least one portion of the global shutter sensor; and wherein the global shutter sensor further includes at least one output that provides a signal to the at least one switch to cause either the first source to emit outgoing electromagnetic energy substantially in the first portion of the electromagnetic spectrum or the wide band source to emit outgoing electromagnetic energy substantially at wavelengths in the third portion of the electromagnetic spectrum as image data is acquired from at least a portion of the global shutter sensor.

2. The machine-readable symbol reader of claim 1 wherein the first portion of the electromagnetic spectrum includes at least a portion of the blue portion of the electromagnetic spectrum and at least a portion of the ultraviolet portion of the electromagnetic spectrum.

3. The machine-readable symbol reader of claim 1 wherein the first source is operable to emit the electromagnetic energy at an intensity level substantially greater than an intensity level of light in an ambient environment.

4. The machine-readable symbol reader of claim 1 wherein the first source is operable to emit the outgoing electromagnetic energy at wavelengths of about 495 nanometers (nm) or less.

5. The machine-readable symbol reader of claim 1:
wherein the color filter array comprises a Bayer filter; and
wherein the first portion of the color filter array comprises an aggregate area of at least about 25% of a color filter array area relative to the global shutter sensor.

6. The machine-readable symbol reader of claim 1 wherein the first source comprises at least one blue light emitting diode (LED).

7. The machine-readable symbol reader of claim 1 wherein:
the at least one switch coupled to control the global shutter sensor to selectively place the global shutter sensor in an image capture mode without emission of the first outgoing electromagnetic radiation by the first source; and
the filter includes at least a second portion which substantially passes the incoming electromagnetic energy of wavelengths in the about 380 nm to about 760 nm portion of the electromagnetic spectrum to the global shutter sensor.

8. The machine-readable symbol reader of claim 1 wherein the global shutter sensor comprises at least one output to provide a signal to the at least one switch, the at least one switch configured to cause the first source to emit the outgoing electromagnetic energy substantially in the first portion of the electromagnetic spectrum as image data is acquired from at least a portion of the global shutter sensor.

9. The machine-readable symbol reader of claim 8 wherein the emission by the first source of the outgoing electromagnetic energy of wavelengths substantially in the first portion of the electromagnetic spectrum includes a pulsed emission having a duration substantially equal to an image acquisition duration of at least a portion of the global shutter sensor.

10. The machine-readable symbol reader of claim 1 wherein the at least one switch further selectively controls the first source to not emit the outgoing electromagnetic energy of wavelengths substantially in the first portion of the electromagnetic spectrum when the wide band source emits the outgoing electromagnetic energy of wavelengths substantially in the third portion of the electromagnetic spectrum.

11. The machine-readable symbol reader of claim 1 wherein the wide band source is operable to emit the electromagnetic energy at an intensity level substantially greater than an intensity level of light in an ambient environment.

12. The machine-readable symbol reader of claim 1 wherein the wide band source comprises at least one of a red light emitting diode (LED) and a white light emitting diode (LED).

13. The machine-readable symbol reader of claim 1 wherein the at least one switch causes the first source or the broad band source to emit the outgoing electromagnetic energy as one or more pulses, the one or more pulses having a duration substantially equal to the image acquisition duration of at least a portion of the global shutter sensor.

14. A machine-readable symbol reader, comprising:
a housing;
a first source operable to emit outgoing electromagnetic energy substantially at wavelengths in a first portion of an electromagnetic spectrum, out of the housing toward a target, the first portion of the electromagnetic spectrum consisting essentially of at least one of a blue portion or an ultraviolet portion of the electromagnetic spectrum, inclusive;
at least one switch coupled to control at least the first source to selectively cause the first source to emit the outgoing electromagnetic energy substantially at wavelengths in the first portion of the electromagnetic spectrum;
a global shutter sensor positioned in the housing to receive incoming electromagnetic energy returned from the target; and
a color filter array disposed in the housing relative to the global shutter sensor to filter the incoming electromagnetic energy, the color filter array including at least a first portion of which substantially passes incoming electromagnetic energy of wavelengths in a second portion of the electromagnetic spectrum to at least one portion of the global shutter sensor and which first portion substantially limits the passage of incoming electromagnetic energy of wavelengths outside of the second portion of the electromagnetic spectrum to the global shutter sensor, the second portion of the electromagnetic spectrum consisting essentially of at least one of a red portion or an infrared portion of the electromagnetic spectrum, inclusive; and a narrow band source operable to emit outgoing electromagnetic energy of wavelengths substantially in the second portion of the electromagnetic spectrum out of the housing toward the target, wherein:

the at least one switch is coupled to control the narrow band source to selectively emit the outgoing electromagnetic energy of wavelengths substantially in the second portion of the electromagnetic spectrum and the at least one switch selectively controls the narrow band source to not emit the outgoing electromagnetic energy of wavelengths substantially in the second portion of the electromagnetic spectrum when the first source emits the outgoing electromagnetic energy of wavelengths substantially in the first portion of the electromagnetic spectrum; and the first portion of the filter substantially passes the incoming electromagnetic energy of wavelengths in at least part of the second portion of the electromagnetic spectrum to at least one portion of the global shutter sensor; and wherein the global shutter sensor comprises at least one output that provides a signal to the at least one switch to cause either the first source to emit outgoing electromagnetic energy substantially in the first portion of the electromagnetic spectrum or the narrow band source to emit outgoing electromagnetic energy substantially at wavelengths in the second portion of the electromagnetic spectrum.

15. The machine-readable symbol reader of claim 14, wherein the narrow band source comprises at least one infrared light emitting diode (LED).

16. The machine-readable symbol reader of claim 14 wherein the at least one switch causes the first source or the narrow band source to emit the outgoing electromagnetic energy as one or more pulses, the one or more pulses having a duration substantially equal to the image acquisition duration of at least a portion of the global shutter sensor.

17. An image detection method, comprising:
supplying a signal to control at least a first source;
responsive to supplying the control signal to the first source, emitting by the first source an outgoing electromagnetic energy substantially at wavelengths in a first portion of an electromagnetic spectrum toward a target; the first portion of the electromagnetic spectrum consisting essentially of at least one of a blue portion or an ultraviolet portion of the electromagnetic spectrum, inclusive;
responsive to the emitting the outgoing electromagnetic energy towards the target, acquiring data from a global shutter sensor that receives, through a color filter array, an incoming electromagnetic energy returned from the target, the color filter array including at least a first portion that substantially passes the incoming electromagnetic energy of wavelengths in a second portion of the electromagnetic spectrum to at least one portion of the global shutter sensor and which first portion substantially limits the passage of incoming electromagnetic energy of wavelengths outside of the second portion of the electromagnetic spectrum to the global shutter sensor, the second portion of the electromagnetic spectrum consisting essentially of at least one of a red portion or an infrared portion of the electromagnetic spectrum, inclusive;
supplying a signal to control a wide band source; and
responsive to supplying the signal to control the wide band source, emitting by the wide band source an outgoing electromagnetic energy substantially at wavelengths in a third portion of the electromagnetic spectrum toward the target, the third portion consisting essentially of wavelengths from about 380 nanometers (nm) to about 760 nm, wherein the signal selectively inhibits the wide band source from emitting the outgoing electromagnetic energy of wavelengths substantially in the third portion of the electromagnetic spectrum when the first source is emitting the outgoing electromagnetic energy of wavelengths substantially in the first portion of the electromagnetic spectrum, the color filter array includes at least a second portion that substantially passes incoming electromagnetic energy having wavelengths in the third portion of the electromagnetic spectrum to a second portion of the global shutter sensor; wherein emitting by the first source the outgoing electromagnetic energy substantially at wavelengths in the first portion of an electromagnetic spectrum toward the target includes emitting a pulsed emission of the outgoing electromagnetic energy substantially at wavelengths in the first portion of the electromagnetic spectrum as the data is acquired from the global shutter sensor, wherein emitting by the wide band source the outgoing electromagnetic energy substantially at wavelengths in the third portion of an electromagnetic spectrum toward the target includes emitting a pulsed emission of the outgoing electromagnetic energy substantially at wavelengths in the third portion of the electromagnetic spectrum as the data is acquired from the global shutter sensor.

18. The image detection method of claim 17 wherein supplying a signal to at least a first source comprises:
detecting actuation of an actuator disposed at least partially on an exterior surface of a housing, the actuator to provide an input to the global shutter sensor; and
generating the signal as an output from the global shutter sensor upon receipt of the input to the global shutter sensor.

19. The image detection method of claim 17 wherein emitting by the first source the outgoing electromagnetic energy substantially at wavelengths in the first portion of an electromagnetic spectrum toward the target includes emitting a pulsed emission of the outgoing electromagnetic energy substantially at wavelengths in the first portion of the electromagnetic spectrum as the data is acquired from the global shutter sensor.

20. The image detection method of claim 17, further comprising:
decoding at least a portion of the data acquired from the global shutter sensor, the decoding including at least one of:
determining a validity associated with the target;
determining a monetary value associated with the target;
determining an origination point associated with the target;
determining a destination point associated with the target; and determining a class of service associated with the target.

21. The image detection method of claim 17 wherein in response to the signal controlling the first source to not emit the outgoing electromagnetic energy of wavelengths substantially in the first portion of the electromagnetic spectrum when the wide band source emits the outgoing electromagnetic energy of wavelengths substantially in the third portion of the electromagnetic spectrum.

22. An image detection method, comprising:
supplying a signal to control at least a first source;
responsive to supplying the control signal to the first source, emitting by the first source an outgoing electromagnetic energy substantially at wavelengths in a first portion of an electromagnetic spectrum toward a target; the first portion of the electromagnetic spectrum consisting essentially of at least one of a blue portion or an ultraviolet portion of the electromagnetic spectrum, inclusive;
responsive to the emitting the outgoing electromagnetic energy towards the target, acquiring data from a global shutter sensor that receives, through a color filter array, an incoming electromagnetic energy returned from the target, the color filter array including at least a first portion that substantially passes the incoming electromagnetic energy of wavelengths in a second portion of the electromagnetic spectrum to at least one portion of the global shutter sensor and which first portion substantially limits the passage of incoming electromagnetic energy of wavelengths outside of the second portion of the electromagnetic spectrum to the global shutter sensor, the second portion of the electromagnetic spectrum consisting essentially of at least one of a red portion or an infrared portion of the electromagnetic spectrum, inclusive;
supplying the signal to control a narrow band source;
responsive to supplying the signal to control the narrow band source, emitting by the narrow band source an outgoing electromagnetic energy substantially at wavelengths in the second portion of the electromagnetic spectrum out of the housing toward the target, wherein the signal selectively inhibits the narrow band source from emitting the outgoing electromagnetic energy of wavelengths substantially in the second portion of the electromagnetic spectrum when the first source is emitting the outgoing electromagnetic energy of wavelengths substantially in the first portion of the electromagnetic spectrum, the first portion of the color filter array substantially passes incoming electromagnetic energy having wavelengths in the second portion of the electromagnetic spectrum to the first portion of the global shutter sensor; and
wherein the signal further selectively controls the first source to not emit the outgoing electromagnetic energy of wavelengths substantially in the first portion of the electromagnetic spectrum when the narrow band source emits the outgoing electromagnetic energy of wavelengths substantially in the second portion of the electromagnetic spectrum.

23. The image detection method of claim 22 wherein emitting by the first source the outgoing electromagnetic energy substantially at wavelengths in the first portion of an electromagnetic spectrum toward the target includes emitting a pulsed emission of the outgoing electromagnetic energy substantially at wavelengths in the first portion of the electromagnetic spectrum as the data is acquired from the global shutter sensor, emitting by the narrow band source the outgoing electromagnetic energy substantially at wavelengths in the second portion of an electromagnetic spectrum toward the target comprises a pulsed emission of the outgoing electromagnetic energy substantially at wavelengths in the second portion of the electromagnetic spectrum as the data is acquired from the global shutter sensor.

24. An image detection system, comprising:
a first source communicatively coupled to an output on a global shutter sensor;
the first source operable to emit outgoing electromagnetic energy substantially at wavelengths in a first portion of an electromagnetic spectrum toward a target, the first portion of the electromagnetic spectrum consisting essentially of at least one of a blue portion or an ultraviolet portion of the electromagnetic spectrum, inclusive;
the global shutter sensor configured to receive incoming electromagnetic energy returned from the target communicatively coupled to at least one switch disposed on an exterior surface of a housing;
the global shutter sensor configured to provide a signal via the output to the first source to:
emit outgoing electromagnetic energy substantially at wavelengths in the first portion of the electromagnetic spectrum; and
acquire data associated with an incoming electromagnetic energy of wavelengths in a second portion of the electromagnetic spectrum incident upon at least one portion of the global shutter sensor, the second portion of the electromagnetic spectrum consisting essentially of at least one of a red portion or an infrared portion of the electromagnetic spectrum, inclusive; and
a color filter array including a Bayer filter having:
a first portion comprising an aggregate area of at least about 25% of the color filter array area, the first portion configured to block at least a portion of the incoming electromagnetic energy of wavelengths outside of the second portion of the electromagnetic spectrum from the first portion of the global shutter sensor; and
a second portion comprising an aggregate area of at least 50% of the color filter array area, the second portion configured to pass all or a portion of the incoming electromagnetic energy of wavelengths within the visible electromagnetic spectrum to a second portion of the global shutter sensor.

25. The image detection system of claim 24, further comprising:
a wide band source communicatively coupled to the output on the global shutter sensor;
the wide band source operable to emit outgoing electromagnetic energy substantially at wavelengths in a third portion of an electromagnetic spectrum toward the target, the third portion of the electromagnetic spectrum consisting essentially of wavelengths from about 380 nanometers (nm) to about 760 nm, inclusive;
the global shutter sensor configured to receive incoming electromagnetic energy returned from the target communicatively coupled to at least one switch disposed on an exterior surface of a housing;
the global shutter sensor configured to provide a signal via the output to control either of the first source or the wide band source, the signal to:
emit outgoing electromagnetic energy substantially at wavelengths in the first portion of the electromagnetic spectrum from the first source or emit outgoing electromagnetic energy substantially at wavelengths in the third portion of the electromagnetic spectrum from the wide band source; and acquire data associated with the incoming electromagnetic energy of wavelengths in the second portion of the electromagnetic spectrum incident upon the at least one portion of the global shutter sensor when the first source emits the outgoing electromagnetic energy, or acquire data associated with the incoming electromagnetic energy of wavelengths in the third portion of the electromagnetic spectrum incident upon the second portion of the global shutter sensor when the wide band source emits the outgoing electromagnetic energy.

26. The image detection system of claim 24, further comprising:

a narrow band source communicatively coupled to the output on the global shutter sensor;

the narrow band source operable to emit outgoing electromagnetic energy substantially at wavelengths in the second portion of an electromagnetic spectrum toward the target;

the global shutter sensor configured to receive incoming electromagnetic energy returned from the target communicatively coupled to at least one switch disposed on an exterior surface of a housing;

the global shutter sensor configured to provide a signal via the output to control either of the first source or the narrow band source, the signal to:

emit outgoing electromagnetic energy substantially at wavelengths in the first portion of the electromagnetic spectrum from the first source or emit outgoing electromagnetic energy substantially at wavelengths in the second portion of the electromagnetic spectrum from the narrow band source; and acquire data associated with the incoming electromagnetic energy of wavelengths in the second portion of the electromagnetic spectrum incident upon the at least one portion of the global shutter sensor when the first source or emits the outgoing electromagnetic energy, or acquire data associated with the incoming electromagnetic energy of wavelengths in the second portion of the electromagnetic spectrum incident upon the at least one portion of the global shutter sensor when the narrow band source emits the outgoing electromagnetic energy.

* * * * *